Patented Oct. 22, 1935

2,018,524

UNITED STATES PATENT OFFICE 2,018,524

CARPET MATERIAL

Albert W. Holmberg, Naugatuck, Conn., assignor, by mesne assignments, to United States Rubber Company, New York, N. Y., a corporation of New Jersey No Drawing. Application September 1, 1933, Serial No. 687,817

4 Claims. (Cl. 91—68)

This invention relates to carpet materials and more particularly to the sizing or coating on the backing of such carpet materials.

It is common practice to coat or size carpet backings by means of a 10 to 15% water solution of boiled starch. This boiled starch solution is generally applied to rug backings at a temperature of around 180° F. and on drying forms a stiff sizing which gives the rug the desirable firmness, hardness and body. This sizing, however, cracks off during wear and is dissolved out when the rug is washed, leaving the carpet or rug in an undesirably weakened and flabby condition. Latex containing 35 to 60% rubber solids is sometimes used to size the backing and act as a stiffening material, and also in some cases to lock the pile. Such a sizing material, however, does not have the boardiness and rigidity of a starch sizing but does adhere satisfactorily to the backing during wear and washing of the carpet material. Mixtures of boiled starch and latex in equal proportions have also been used as sizing materials for rug backings but as with the use of boiled starch alone, such a sizing cracks under flexing and tends to dust off, the rubber material failing to hold the starch stiffening material to the fibers in the backing.

In preparing the sizing materials heretofore used, alone or admixed with latex, as before described, the carbohydrate materials, such as starches, dextrines and the like, become peptized in the presence of water at elevated temperatures, whether or not a preliminary swelling of the carbohydrate material has been allowed to take place in water at room temperature. The effect of starch granules in cold water, for example, is limited to increasing the size thereof without disrupting the external sheath or covering of same. When the water swollen granule or the normal unbroken granule is subjected to elevated temperature for various periods of time, as in the preparation of boiled starch, the cell wall is actually ruptured, and the amylo pectin is permitted to diffuse out into the aqueous phase and effect a colloidal dispersion of the granule content. Thus when such a colloidal dispersion of peptized starch, for example, is mixed with latex, the dispersed starch particles migrate throughout the aqueous phase along with the dispersed rubber globules and engulf and surround the same. As a result, when films of such a latex system are dehydrated, as in the drying of a rug sizing, the characteristics of the external starch phase predominate rather than the true flexible rubber-like characteristics of the latex globules which are situated beneath such external phase or coating. This relationship is reflected in increased stiffness, boardiness and rigidity by virtue of the starch but results in a cracking under flexing. In other words, such a compound has all of the properties of a starch size, both good and bad, with very few of the desirable properties associated with the increased flexibility of the rubber, since the latter remains beneath the surface in the form of discrete, isolated, or separated rubber globules.

The present invention relates to the production of carpet sizings having any desired degree of stiffness, boardiness and rigidity characteristic of a starch sizing and yet providing a method of locking the starch sizing to the backing so that it will not crack under flexing and furthermore impart in addition the desirable characteristics of increased flexibility, adhesion, water-proofing, and non-slip qualities associated with a rubber sizing.

According to the present invention it has been found possible to incorporate extremely large amounts of carbohydrate materials in a latex system for the production of sizing materials for carpets without impairing the flexibility and true rubber characteristics of the finished film after drying. This is accomplished by controlling or eliminating peptization of the carbohydrate substances as a result of which we find the unpeptized, although water swollen, carbohydrate granule with the external sheath still unruptured, dispersed in rubber as the continuous phase in the dried film. With raw starch, for example, mixed with latex, the rubber of the dried sizing will be in a continuous phase and the coating will possess all of the desirable characteristics of such a rubber film as well as certain of the desirable properties characteristic of the starch granule but free from the undesirable characteristics of cracking or breaking on flexing. Carbohydrate materials such as starches from wheat, corn, rice, tapioca, potato, arrowroot, etc., dextrines and the like, either in the form in which they are normally obtained or as flour in the dry condition or swollen with cold water, are added directly to a latex system. In no case is it considered advisable to introduce the factor of elevated temperature because of the danger of rupturing the cell walls of the unpeptized carbohydrate material. In addition, larger amounts of carbohydrate materials may be added to the latex without sacrificing the rubber qualities of the resultant sizing, and with advantages in lower equipment costs, greater ease in handling, and definite economic saving. When these materials are added to the latex, there may be observed a very slight increase in viscosity but such increase in viscosity is entirely incommensurate with the sudden increase in viscosity and thickening effect noted with previously peptized carbohydrate solutions or dispersions. The various aqueous dispersions of rubber, such as latex, or artificial dispersions of crude or reclaimed rubber or rubber-like materials may be used with the unpeptized carbohydrate material such as a raw starch, and such rubber dispersion may be compounded as desired. Preferably, the aqueous dispersion contains vulcanizing ingredients so that vulcanization of the rubber in the sizing may take place during the drying operation or thereafter, if desired. Various natural latices such as normal latex or latex concentrated by a heat evaporation, or a chemical creaming process, or a mechanical creaming process, i. e., centrifuging, or a so-called vulcanized latex may be used.

The following examples of a latex and raw starch sizing is included merely as an illustration of the invention:

| | Parts |
|---|---|
| Rubber as creamed latex 60% solids | 100. |
| Water in cream | 66. |
| Stabilizing agent | 4. |
| Water (to dissolve stabilizing agent) | 36. |
| Paste: | |
|     Water | 8. |
|     Sulphur (precipitated) | 2. |
|     Zinc oxide | 3. |
|     KOH | 0.5 |
|     Glue | 0.1 |
| Raw tapioca starch | 170. |
| Water (cold) | 414. |
| Accelerator | 0.85 |
| Antioxidant | .33 |
| Preservative | .2 |

Such a composition will provide a desirable sizing for the carpet backing containing a major proportion of raw starch and a minor proportion of rubber.

It will be apparent to those skilled in the art that any desired viscosity, thickness or apparent fluidity of the above system may be obtained by raising or lowering the amount of water used, with the corresponding effect on the total solids content. In addition, any of the well known methods of thickening latex systems or the addition of thickening agents may be used. An efficient method of securing increased viscosity effects in the above system is by the addition of a small amount of the tapioca starch in a peptized condition, as for example, by adding 5 to 30 parts of tapioca starch previously boiled in 45 to 270 parts of water. This small amount of boiled starch produces the desired thickening in the cold latex system for the purpose of controlling the weight of sizing applied as desired but is not sufficient to detrimentally affect the final properties of the dried sizing. With carpet sizings prepared from compositions according to the present invention, there is no evidence of cracking under flexing or dusting off of the carbohydrate material or of reversibility on water during washing or shampooing of the rug for example. Such a coating has a rubbery appearance even when extremely high amounts of starch have been added to produce the desirable body to the backing, and yet the backing retains the desirable rubber properties of flexibility and non-slipping characteristics. The term "carpet", or "carpet backing", as used in the description and claims is intended to include rugs, mats and similar fabrications, or the backings thereof, respectively.

With the above detailed disclosure of the invention, it is evident that numerous modifications will suggest themselves to those skilled in the art and it is not desired to limit the invention otherwise than as set forth in the appended claims.

Having thus described my invention, what I claim and desire to protect by Letters Patent is:

1. A carpet comprising a wearing surface and a backing, said backing having a coating thereon comprising an admixture of unpeptized carbohydrate material and rubber.

2. A carpet comprising a wearing surface and a backing, said backing having a coating thereon comprising an admixture of raw starch and rubber.

3. A carpet comprising a wearing surface and a backing, said backing having a coating thereon comprising an admixture of raw starch and the directly deposited solids of an aqueous dispersion of rubber.

4. A carpet comprising a wearing surface and a backing thereon comprising an admixture of a major proportion of raw starch and a minor proportion of the directly deposited solids of an aqueous dispersion of rubber.

ALBERT W. HOLMBERG.